US006965972B2

(12) United States Patent
Nanda et al.

(10) Patent No.: US 6,965,972 B2
(45) Date of Patent: Nov. 15, 2005

(54) REAL TIME EMULATION OF COHERENCE DIRECTORIES USING GLOBAL SPARSE DIRECTORIES

(75) Inventors: Ashwini Nanda, Mohegan Lake, NY (US); Krishnan Sugavanam, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 10/254,745

(22) Filed: Sep. 25, 2002

(65) Prior Publication Data

US 2004/0059876 A1 Mar. 25, 2004

(51) Int. Cl.[7] .............................................. G06F 12/00

(52) U.S. Cl. .................. 711/141; 711/119; 703/27; 716/16; 716/17

(58) Field of Search ................. 711/118–121, 124–126, 711/130, 133, 137, 141, 147, 205, 207, 221; 716/16–17; 703/27

(56) References Cited

U.S. PATENT DOCUMENTS

| 5,684,977 A | * | 11/1997 | Van Loo et al. ............. 711/143 |
| 5,867,648 A | * | 2/1999 | Foth et al. .................. 709/230 |
| 5,895,487 A | * | 4/1999 | Boyd et al. ................. 711/122 |
| 6,044,438 A | * | 3/2000 | Olnowich .................... 711/130 |
| 6,295,598 B1 | * | 9/2001 | Bertoni et al. ................ 712/28 |
| 6,560,681 B1 | * | 5/2003 | Wilson et al. ............. 711/144 |
| 6,625,694 B2 | * | 9/2003 | Masri et al. ................ 711/133 |
| 2002/0161568 A1 | * | 10/2002 | Itoh et al. ...................... 704/2 |

OTHER PUBLICATIONS

Furuta et al, Feb. 15-17, 1999, ISSCC, pp. 364-479.*

* cited by examiner

*Primary Examiner*—Brian R. Peugh
(74) *Attorney, Agent, or Firm*—Gibb I.P. Law Firm, LLC; Eustus D. Nelson, Esq.

(57) ABSTRACT

A method and structure for an emulation system comprises of a plurality of field programmable gate arrays adapted to emulate nodes of a multi-node shared memory system, a plurality of cache directories, each connected to one of the arrays, and a plurality of global coherence directories, each connected to one of the arrays. Each of the global coherence directories maintain information on all memory lines remotely cached by each of the cache directories.

7 Claims, 4 Drawing Sheets

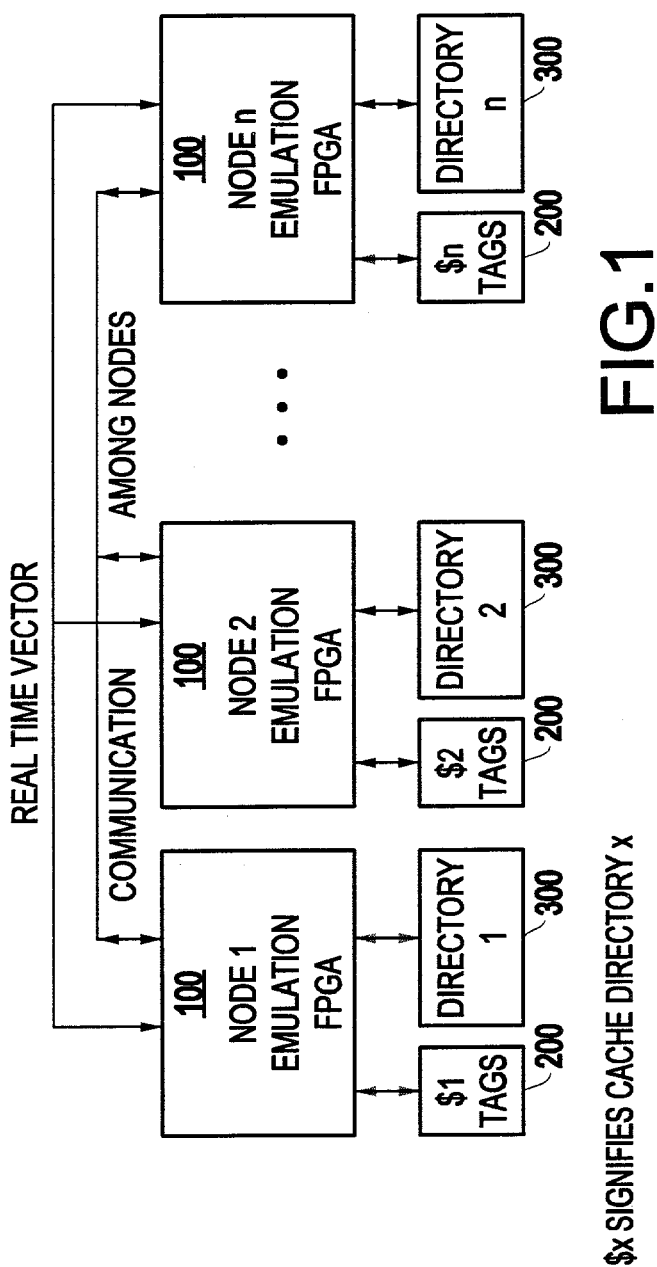
FIG.1
$x signifies cache directory x
FIG.2
TYPE OF TRANSACTION SIGNIFIES READ, WRITE, INVALIDATE, ETC.

REAL TIME EMULATION OF COHERENCE DIRECTORIES USING GLOBAL SPARSE DIRECTORIES

BACKGROUND OF THE INVENTION

1. Field of the Invention

This invention relates to the efficient real time emulation of coherence directories in shared memory multiprocessor systems using directory based cache coherence.

2. Description of the Related Art

Conventional computer systems often include on chip or off chip cache memories which are used with processors to speed up accesses to system memory. In a shared memory multiprocessor system, more than one processor can store a copy of the same memory location(s) (or line(s)) in its cache memory. A cache coherence mechanism is required to maintain consistency among the multiple cached copies of the same memory line.

In small, bus based multiprocessor systems, the coherence mechanism is usually implemented as a part of the cache controller using a snoopy coherence protocol. The snoopy protocol cannot be used in large systems that are connected through an interconnection network due to the lack of a bus. As a result, these systems use a directory based protocol to maintain cache coherence. The directories are associated with the main memory and they maintain the state information of the cached memory lines. This state information includes data indicating which cache(s) has a copy of the line or whether the line has been modified in a cache. One of the area efficient implementations of coherence directories is the "sparse directory" which has the capability to store the state of a limited number of memory lines. The sparse directory includes state information entries for only a subset of the memory lines of main memory.

An important factor in building distributed shared memory systems is the size of the caches as well as the size of the coherence directories. These play an important role in determining the price and performance of such systems. It is imperative to choose the right size of the caches and coherence directories through emulation before actually building expensive multiprocessor systems as these sizes cannot be easily changed after manufacture.

Simulation and real time emulation are two mechanisms used to evaluate the different sizes of the caches and coherence directories and arrive at an optimal value for a given price and performance. Simulation can either be trace driven or execution driven. With the increasing size of workloads and caches, billions of execution cycles need to be simulated or emulated to arrive at the optimal value of the caches and coherence directories. The prohibitive storage requirements for collecting these traces make trace driven simulation unattractive. Execution driven simulation, though free from such storage requirements, is also slow to run the billions of execution cycles normally required. Hence real time emulation becomes the preferred solution for the evaluation of modern day caches and coherence directories with current workloads. Real time emulators are usually designed using field programmable gate arrays (FPGA) as an application specific integrated circuit (ASIC) solution is very expensive.

SUMMARY OF THE INVENTION

The invention provides efficient real time emulation of coherence directories so as to maximize emulation efficiency. This method includes the duplication of coherence directories used by the emulating FPGA nodes. This minimizes communication among the FPGAs (thus reducing the pins used). Further, with this invention, the number of cycles needed to process a real time vector is reduced. This reduces the number of pipeline stages in an FPGA which has a direct bearing on the resources used inside the FPGA and hence the area. This method trades the area and pin complexity of an FPGA with an increased DRAM size (needed for duplicating the coherence directories). As DRAMs are inexpensive, this trade off makes the design of a high speed real time emulator feasible.

More specifically, the emulation system has field programmable gate arrays that are adapted to emulate nodes of a multi-node shared memory system, cache directories that are each connected to one of the arrays, and global coherence directories that are each connected to one of the arrays. Each of the global coherence directories maintains information on all memory lines remotely cached by each of the cache directories. The global coherence directories are sparse directories. The cache directories also maintain information relating to memory lines cached by the local array. The nodes represent different computers in a multi-computer network. All of the global coherence directories of the multi-node shared memory system maintain identical information. As the global coherence directories maintain information on all memory lines remotely cached by each of the cache directories, communication among the arrays is decreased and emulation efficiency is increased. The emulation efficiency is defined as a metric which is inversely proportional to pin utilization and area utilization of the arrays.

The invention also provides a method of designing an emulation system, that comprises designing a plurality of field programmable gate arrays to emulate nodes of a multi-node shared memory system, connecting a plurality of cache directories to the arrays, and connecting a plurality of global coherence directories to one of the arrays. Each of the global coherence directories maintains information on all memory lines remotely cached by each of the cache directories. The designing of the arrays is performed such that the global coherence directories maintain information relating to memory lines cached by remote arrays, and the cache directories maintain information relating only to memory lines cached by the respective local array to which each of the cache directories are connected. All nodes of the multi-node shared memory system have a copy of coherence directories of all other nodes. As the global coherence directories maintain information on all memory lines remotely cached by each of the cache directories, communication among the arrays is decreased and emulation efficiency is increased.

BRIEF DESCRIPTION OF THE DRAWINGS

The foregoing and other objects, aspects, and advantages will be better understood from the following non-limiting detailed description of preferred embodiments of the invention with reference to the drawings that include the following:

FIG. 1 is a block diagram of one real time emulator, emulating an "n" node distributed shared memory system.

FIG. 2 shows the format of the real time vector used by the emulator.

DETAILED DESCRIPTION OF PREFERRED EMBODIMENTS OF THE INVENTION

Figure 3:
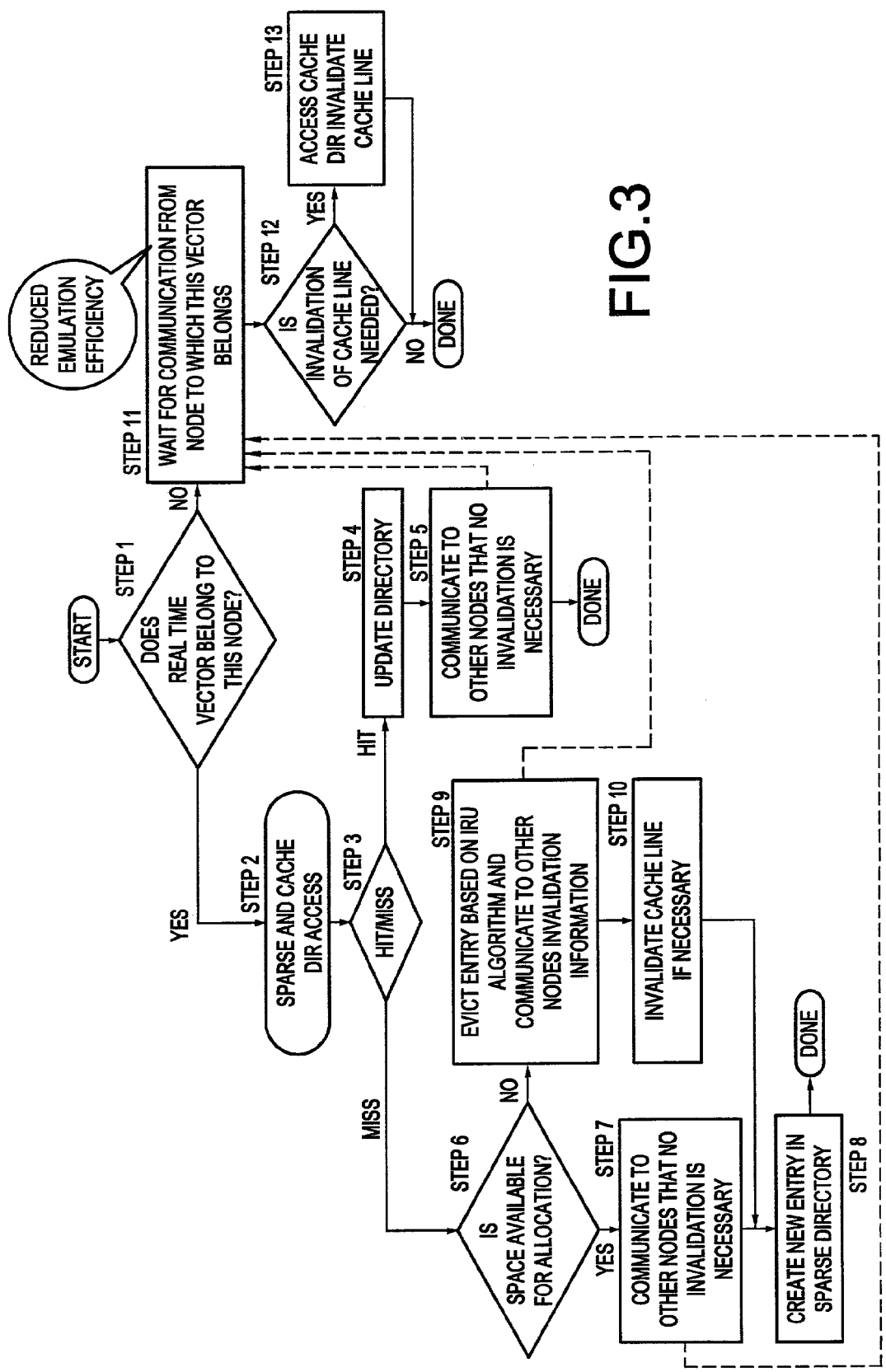
FIG. 3 outlines the steps to be performed in real time emulation in the structure shown in FIG. 1.

Each node emulating a coherence directory (for example, sparse directory) in a distributed shared memory system is responsible for maintaining the cache directory of memory lines cached by the node as well as the sparse directory for maintaining the status of memory locations belonging to that node that may be in cache directories of other nodes. When an entry in the sparse directory is replaced, this information has to be propagated to all the nodes that share this cache line. In real time emulation in which requests arrive every cycle, this makes the pipeline for every transaction deep, thus consuming more area and pins and making it difficult to maintain throughput. Thus greatly reduces emulation efficiency.

To illustrate one example of real time emulation, assume that there is an "m" processor machine with each processor having its own level 1 and level 2 caches. Let the total addressable memory space be "M" bytes. It may be preferable to emulate an "n" node distributed shared memory system where each of the "m" processors belongs to one of the "n" nodes. Let the memory address space "M" be divided into "n" equal regions with each node responsible for 1/n of the total addressable memory space. Let each node "n" have its own level 3 cache and a sparse directory which maintains the state information about the memory lines belonging to that node which are cached by other nodes. The purpose of the real time emulation is to arrive at the optimal size and associativity of the level 3 caches and the sparse directory. A real time vector is generated by an "m" processor machine whenever any of the "m" processors suffer a miss in its respective level 2 cache or wants to gain exclusive ownership to a cache line which is currently shared by other processors.

FIG. 1 shows "n" FPGAs 100 emulating "n" nodes of a shared memory multiprocessor system. Each FPGA 100 controls a cache tag directory 200 and a sparse directory 300. Each sparse directory 300 maintains information on the memory lines of the particular node to which it is connected which are cached by the remote nodes. The cache tag and sparse directories are usually implemented using low cost dynamic random access memories (DRAMs). When such a real time vector (the format of which is shown in FIG. 2) is presented to all the "n" nodes, each node determines whether that particular vector belongs to its memory space. The node to which this vector belongs, checks its sparse directory to find out whether such an entry is present in the sparse directory. If it is not, and the access is by a remote node, then the node creates a new sparse directory entry with information derived from the address presented. If the sparse directory is full, then it has to forcibly evict an entry (say, the least used entry). This evicted entry might be cached in other nodes. Hence, information about this entry has to be sent to all the other nodes (this gives rise to communication among FPGAs which uses precious pin resources). Each node then compares the address of the evicted line with its own cache tag entries to determine whether they have this entry in their cache or not. If they do, then they invalidate this line from their respective caches.

One issue with real time emulators is the complexity of their design. Though the field programmable gate array technology is constantly improving, fitting a high speed emulator in an FPGA is still a challenging task. The lesser the area utilized by the design and the lower the pins used in an FPGA, the better the chances of realizing such high speed emulators. Hence "emulation efficiency" is defined as a metric which is inversely proportional to the pin utilization and the area utilization of an FPGA.

A step by step approach for implementing the real time emulation discussed above is shown in FIG. 3. In step 1, each node compares whether the real time vector belongs to its memory space (local memory space) or not. If the real time vector belongs to its local memory space, processing is continued starting from step 2. Otherwise, steps starting from step 13 (discussed below) are used. In step 2, the node accesses both its local sparse and cache directories. In step 3, the node determines whether the vector address was a hit or a miss in the sparse directory. If the vector address is a miss, then steps starting from step 6 are executed. Otherwise, steps starting from step 4 are executed.

In step 4, as the vector address is a hit, the sparse directory entry (which contains information about which processors share this memory line and whether it is modified) is examined. If the modified bit is set or if the vector signifies that it is a write transaction, then all other nodes are informed that invalidation of cache lines are necessary. Otherwise, all other nodes are informed that no invalidation of cache lines are necessary. In step 5, the sparse directory entry is updated and processing is complete.

In step 6, a check is done to find out whether the transaction request is by a remote node or a local node. If the transaction request is by a remote node, steps starting from step 7 are executed. Otherwise steps starting from step 12 are executed.

In step 12, as the sparse directory contains only information of memory lines which are remotely cached, no new entry needs to be created. All nodes are informed that no invalidation of cache lines are needed and processing is complete.

In step 7, a check is done to find out whether there is space available in the sparse directory to accommodate a new entry with an address derived from the vector. If space is available, steps starting from step 8 are executed. Otherwise, steps starting from step 9 are executed. In step 8, all other nodes are informed that no invalidation of cache lines are necessary. Then, in step 11 a new entry is created in the sparse directory and the vector processing is complete. Otherwise, in step 9, an entry is chosen from the sparse directory to be evicted. All other nodes are informed about the entry that has been evicted so that they can evict it out of their caches. Thus, in step 10, the evicted entry from the sparse directory is invalidated from the cache directory (if it is present). Then, step 11 is executed to create a new sparse directory entry and complete the processing of the vector.

In step 13, each node waits for communication about possible cache line invalidation resulting from sparse entry eviction. In step 14, the communication message is checked to find out whether cache line invalidation is necessary. If invalidation of the cache line is not necessary, then the vector processing is complete. If invalidation of the cache line is necessary, then step 15 is executed. In step 15, the cache line is invalidated and the vector processing is complete.

Figure 4:
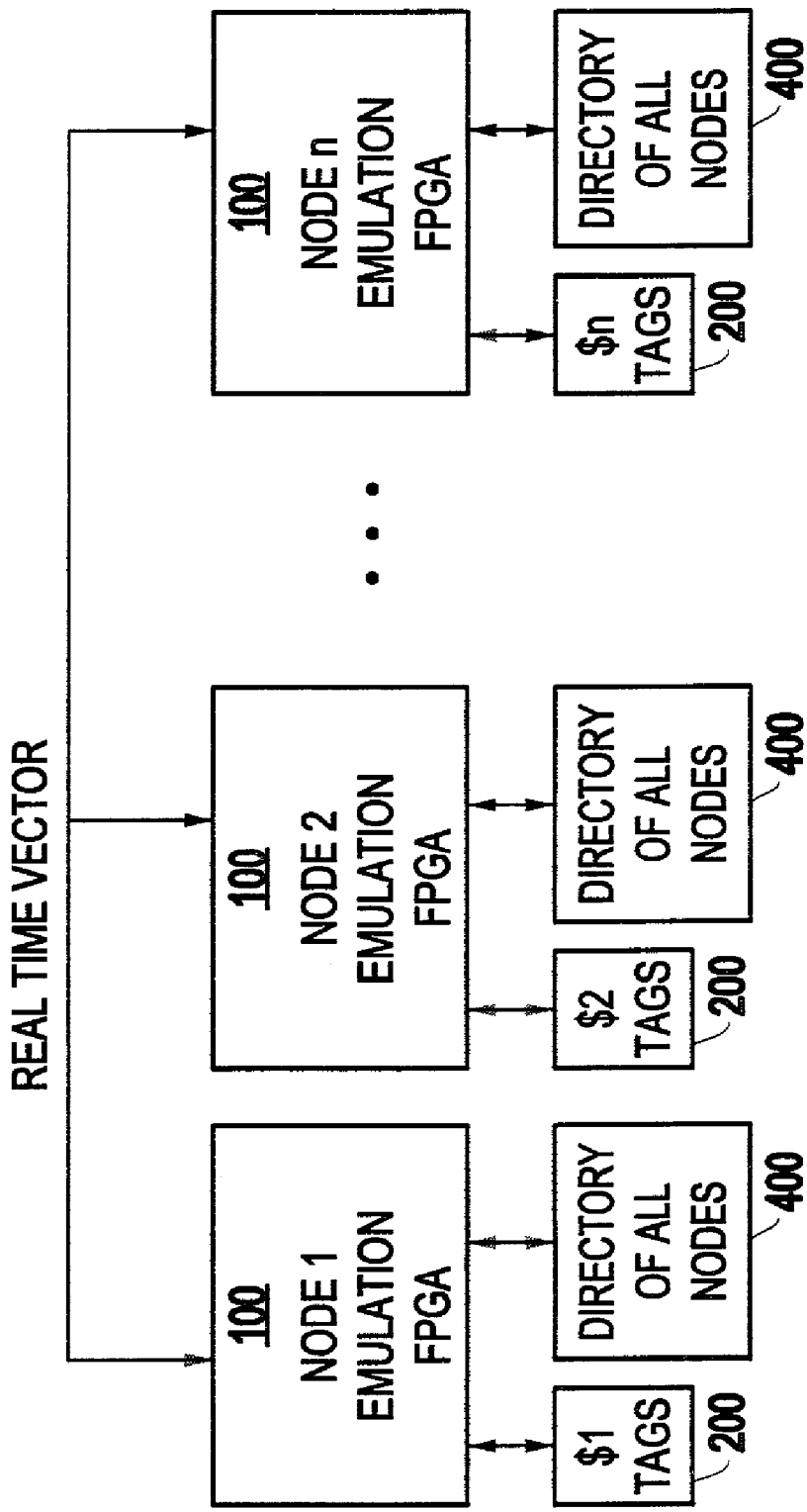
FIG. 4 shows the block diagram of another real time emulator, emulating an "n" node distributed shared memory system.

In a different structure, FIG. 4 shows "n" FPGAs 100 emulating "n" nodes of a shared memory multiprocessor system. The system in FIG. 4 is different than the structure shown in FIG. 3, in that each sparse directory 400 has not only the sparse directory entries belonging to that node (e.g., their local node) but also a copy of the sparse directory entries belonging to all the other nodes (e.g., remote nodes). Thus, all global sparse directories 400 will be identical and will have information relating not only to memory lines of its own local node to which the directory 400 is connected, but also to memory lines of each node of the network that is maintained by any of the other remote directories. Each FPGA controls the cache tag directory 200 as well as the "global" sparse directory 400.

Figure 5:
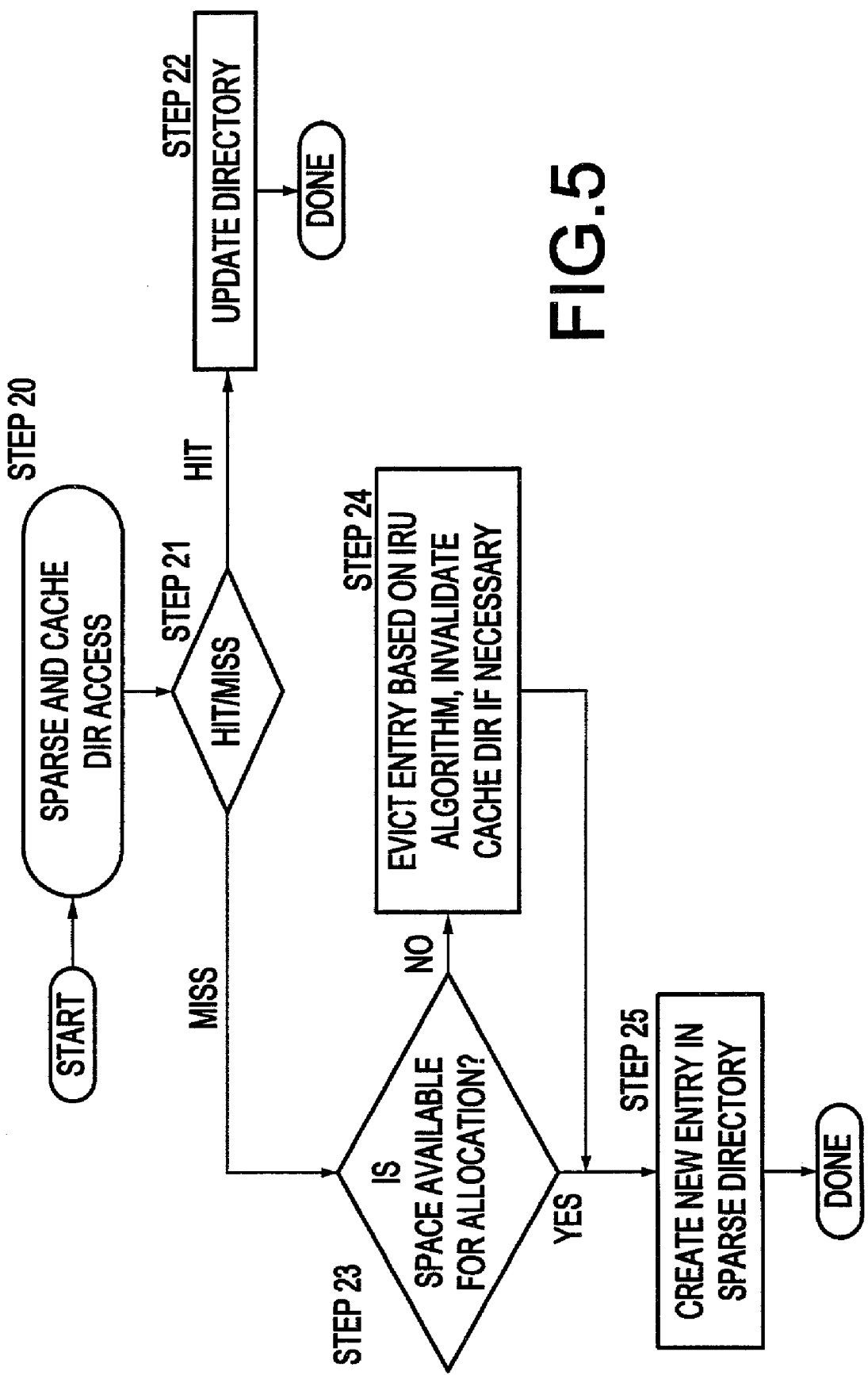
FIG. 5 outlines the steps to be performed in the real time emulation in FIG. 4.

A step by step approach for implementing the real time emulation of the structure shown in FIG. 4 is shown in FIG. 5. In step 20, all nodes access their cache directories as well as the sparse directory of the node whose memory space the vector belongs to. This is possible because all nodes have a copy of the sparse directory of all other nodes (e.g., remote nodes) as well as their own node (local node).

In step 21, the node determines whether the vector address was a hit or a miss in the sparse directory. If the vector address does not hit, then processing executes steps starting from step 24. Otherwise, processing executes steps starting from step 22. In step 22, if the vector address was a hit, the sparse directory entry (which contains information about which processors share this memory line and whether it is modified) is examined. If the modified bit is set or if the vector signifies that it is a write transaction, the cache line (if present) is invalidated from the cache directory. In step 23, the sparse directory entry is updated and the vector processing is complete.

In step 24, a check is done to find out whether the transaction request is by a remote node or a local node. If the transaction request is by a remote node, steps starting from step 25 are executed. Otherwise, as the sparse directory contains only information of memory lines which are remotely cached, no new entry needs to be created and the processing is complete.

In step 25, when there is a miss, a check is done to find out whether there is space available in the sparse directory to accommodate a new entry with an address derived from the vector. If space is available, then it executes steps starting in step 27. In step 27, a new entry is created in the sparse directory and the vector processing is now complete. Otherwise, it executes steps starting from step 26 where an entry is chosen from the sparse directory to be evicted. The evicted entry from the sparse directory is invalidated from the cache directory, if it is present. Then, step 27 is executed to create a new sparse directory entry and the processing is now complete.

Therefore, with the structure shown in FIG. 4, when a real time vector is received, each node checks its global sparse directory. If the vector presented to all the nodes is already present in the sparse directory, then the directory needs to be updated and cache line invalidation is performed if the transaction is a write or if the modified bit is set in the sparse directory entry. If it is not and the access is by a remote node, then each node creates a new sparse directory entry with information derived from the address presented. If the sparse directory is full, then it has to forcibly evict an entry (say, the least used entry). As every node has a copy of the sparse directory belonging to every other node, no information about eviction needs to be sent. When an entry in the sparse directory is to be replaced, each node compares this entry with the entries of its own cache directory and invalidates it if necessary. The cache directory access can potentially be started early in time even before the decision to replace the sparse directory entry is actually taken. This saves pins, area, and time and helps to increase emulation efficiency. The sparse directory entries are usually stored in low cost DRAMs making the overhead of maintaining all the sparse directory entries in every node low. Thus, while the structure shown in FIG. 4 may use larger sparse directories, this is balanced by the pin design simplification and FPGA area size reduction.

The invention provides efficient real time emulation of coherence directories so as to maximize emulation efficiency. This method includes the duplication of coherence directories used by the emulating FPGA nodes. This minimizes communication among the FPGAs (thus reducing the pins used). Further, with the invention the number of cycles needed to process a real time vector is reduced because the eviction information does not need to be communicated between nodes. This reduces the number of pipeline stages in an FPGA which has a direct bearing on the resources used inside the FPGA and hence the area. Thus, the invention trades the area and pin complexity of an FPGA to increased DRAM size needed for duplicating the coherence directories. As DRAMs are inexpensive, this trade off makes the design of a high speed real time emulator feasible.

While the invention has been described in terms of preferred embodiments, those skilled in the art will recognize that the invention can be practiced with modification within the spirit and scope of the appended claims.

What is claimed is:

1. An emulation system comprising:
    a plurality of field programmable gate arrays adapted to emulate nodes of a multi-node shared memory system;
    a plurality of cache directories, each connected to one of said arrays; and
    a plurality of global coherence directories each connected to one of said arrays, wherein each of said global coherence directories maintains information on all memory lines in all of said cache directories;
    wherein by said global coherence directories maintaining information on all memory lines remotely cached by each of said cache directories, communication among said arrays is decreased and emulation efficiency is increased.

2. The system in claim 1, wherein emulation efficiency comprises a metric which is inversely proportional to pin utilization and area utilization of said arrays.

3. An emulation system for a network of computers comprising:
    a plurality of field programmable gate arrays adapted to emulate computers in said network;
    a plurality of cache directories, each connected to one of said arrays; and a plurality of global coherence directories, each connected to one of said arrays, wherein each of said global coherence directories maintains information on all memory lines in all of said cache directories,
    wherein by said global coherence directories maintaining information on all memory lines remotely cached by each of said cache directories, communication among said arrays is decreased and emulation efficiency is increased.

4. The system in claim 3, wherein emulation efficiency comprises a metric which is inversely proportional to pin utilization and area utilization of said arrays.

5. A method of designing an emulation system comprising:
    designing a plurality of field programmable gate arrays to emulate nodes of a multi-node shared memory system, connecting a separate cache directory to each of said arrays; and connecting a separate global coherence directory to each of said arrays, wherein each said global coherence directory maintains information on all memory lines in all cache directories wherein said designing of said arrays is performed such that all nodes of said multi-node shared memory system have a copy of coherence directories of all other nodes.

6. A method of designing an emulation system comprising:

designing a plurality of field programmable gate arrays to emulate nodes of a multi-node shared memory system;

connecting a separate cache directory to each of said arrays; and connecting a separate global coherence directory to each of said arrays, wherein by said global coherence directories information on all memory lines remotely cached by each said cache directories, communication among said arrays is decreased and emulation efficiency is increased.

7. The method in claim 6, wherein emulation efficiency comprises a metric which is inversely proportional to pin utilization and area utilization of said arrays.

* * * * *